(12) United States Patent
Schneider

(10) Patent No.: US 6,796,590 B2
(45) Date of Patent: Sep. 28, 2004

(54) IN-FLOOR SLIDE-OUT ROOM SUPPORT SYSTEM

(75) Inventor: Robert H. Schneider, Beaver Dam, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/181,531

(22) PCT Filed: Jan. 19, 2001

(86) PCT No.: PCT/US01/01739

§ 371 (c)(1),
(2), (4) Date: Nov. 19, 2002

(87) PCT Pub. No.: WO01/53132

PCT Pub. Date: Jul. 26, 2001

(65) Prior Publication Data

US 2003/0205911 A1 Nov. 6, 2003

Related U.S. Application Data

(60) Provisional application No. 60/177,562, filed on Jan. 21, 2000.

(51) Int. Cl.$^7$ ................................................. B60P 3/34
(52) U.S. Cl. ..................... 296/26.13; 296/176; 296/172; 52/67
(58) Field of Search ........................... 296/26.09, 26.13, 296/26.08, 171, 175, 26.12, 172, 176; 52/67

(56) References Cited

U.S. PATENT DOCUMENTS

| 3,797,880 A | 3/1974 | Pezzaglia ...................... 206/26 |
| 4,652,041 A | 3/1987 | Barber et al. ................ 296/171 |
| 5,758,918 A | 6/1998 | Schneider et al. ............ 296/26 |
| 6,067,756 A | 5/2000 | Frerichs et al. ................. 52/67 |

FOREIGN PATENT DOCUMENTS

EP          0 083 317 A     7/1983    ........... B62D/33/08

*Primary Examiner*—Joseph D. Pape
(74) *Attorney, Agent, or Firm*—Quarles & Brady LLP

(57) ABSTRACT

A slide-out room (12) support system (28) for a recreational vehicle (10) has outer C-shaped rails (34) received at least partially within the thickness of the floor (64) with the slot of the C-shape opening downwardly. A fixed support (30) extends up through the slot and mounts four rollers (38), two on each side, which extend into the space between the top wall (42) of the rail (34) and the flanges (40) so as to support the rail (34) generally horizontal and relieve much of the weight of the slide-out room (12) from being borne by the stationary floor of the recreational vehicle (10). A lead screw (46) that moves longitudinally with the rail (34) drives it in and out, and a rack (60, 70) and pinion (62, 68) system synchronizes the movement of the rails (34) when two or more rails (34) are provided. The lead screw (46), or alternatively the rack (60, 70) and pinion (62, 68) system, may be manually or electrically driven.

14 Claims, 5 Drawing Sheets

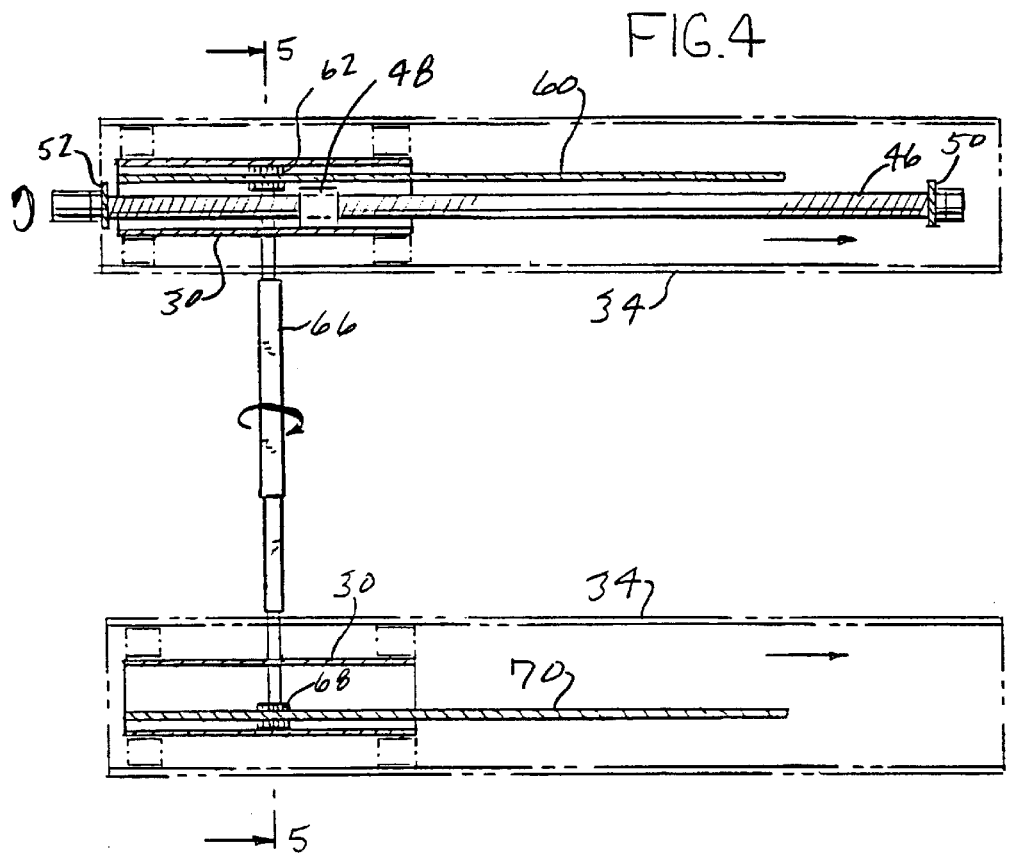
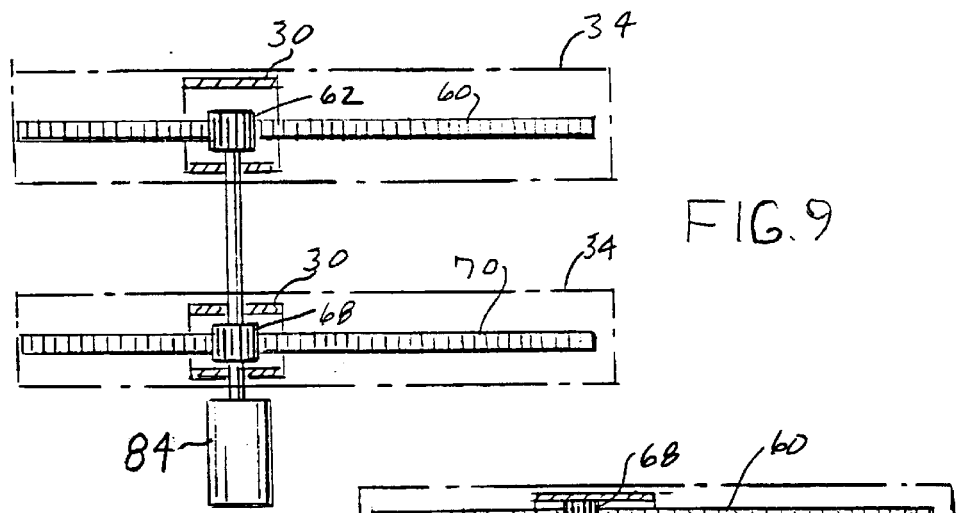
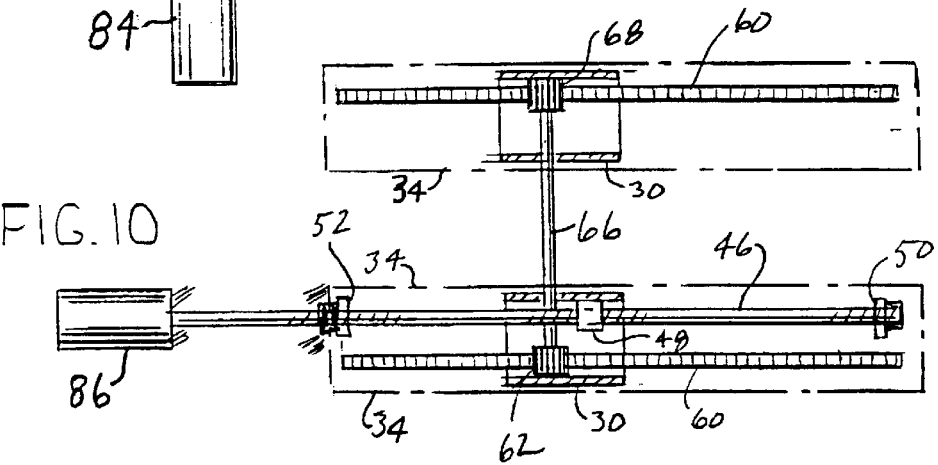

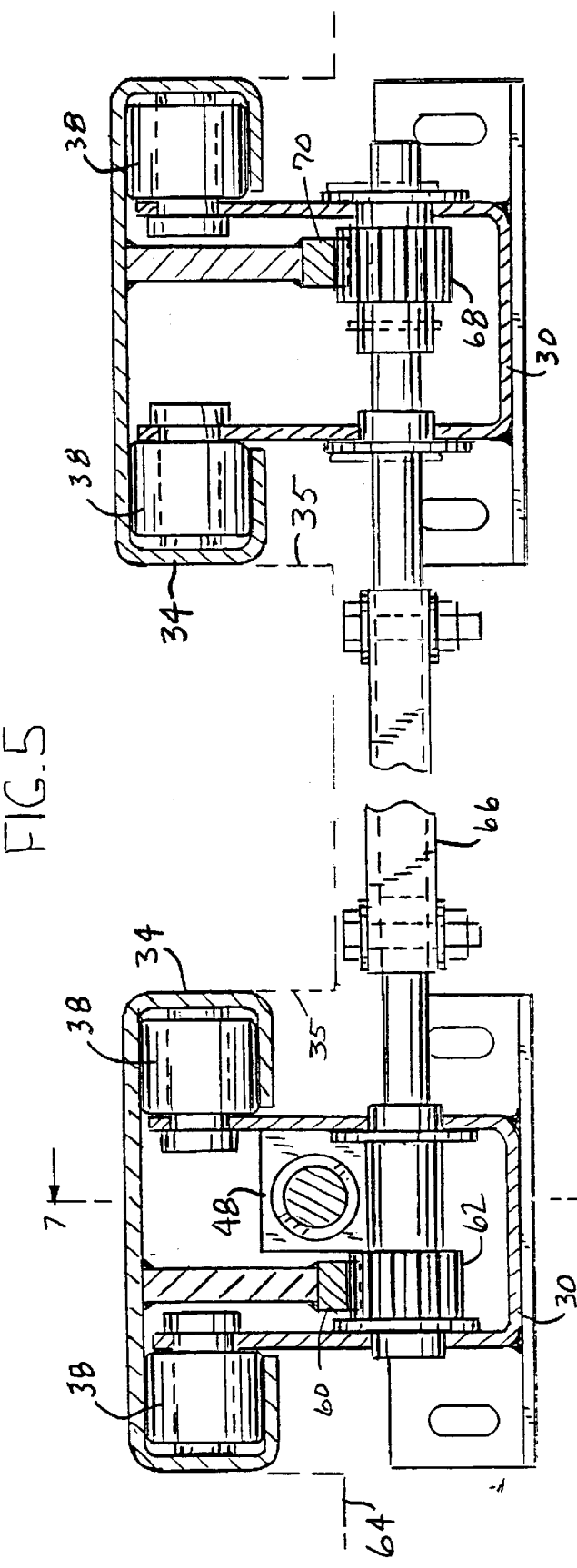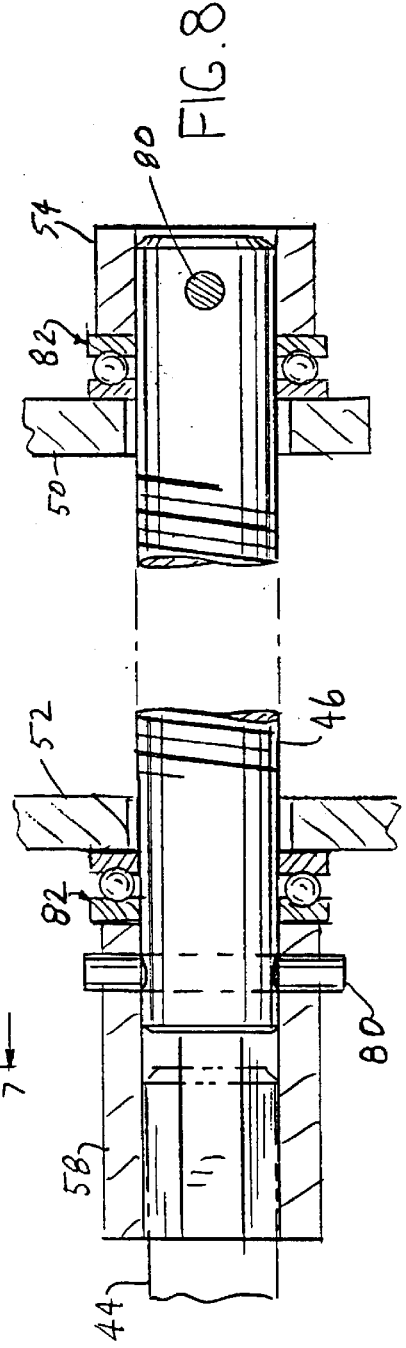

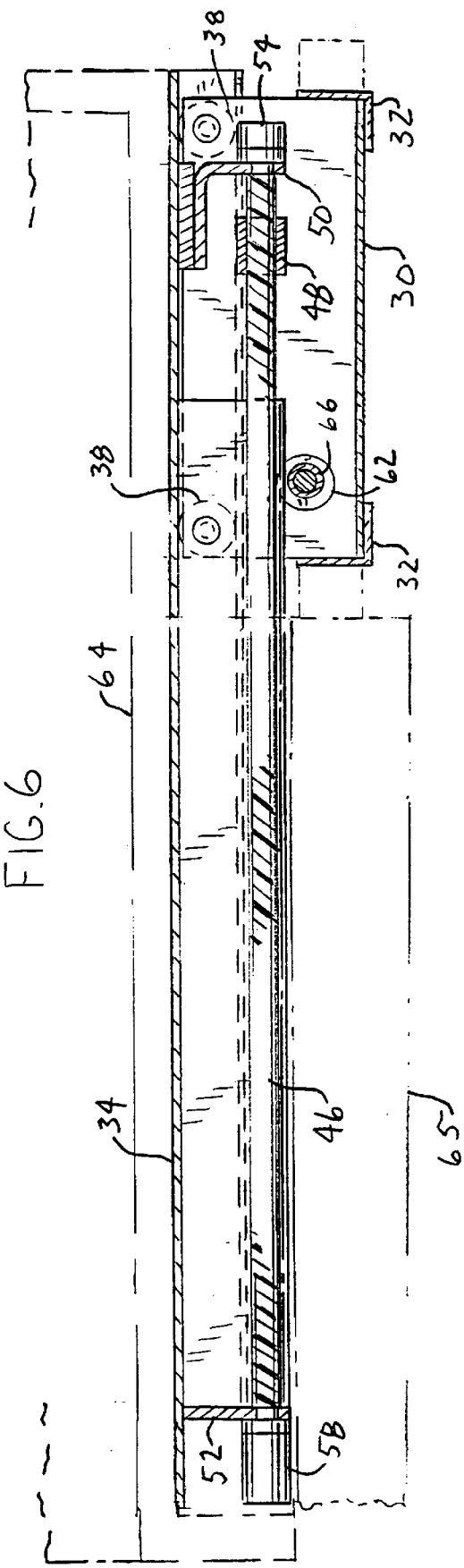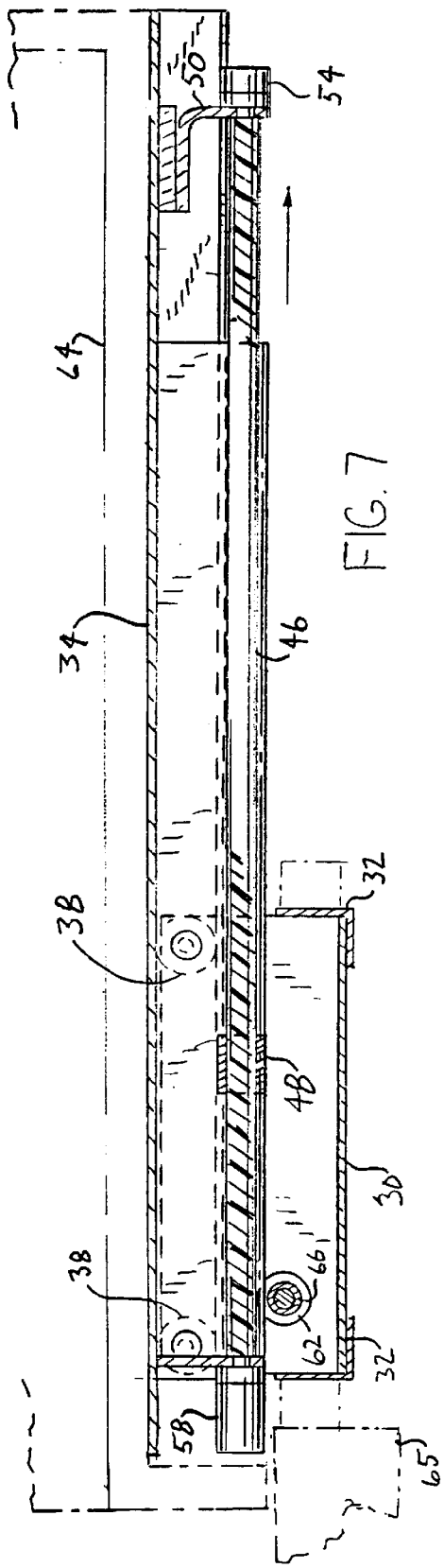

IN-FLOOR SLIDE-OUT ROOM SUPPORT SYSTEM

CROSS-REFERENCE TO RELATED APPLICATION

This application claims the benefit of U.S. Provisional Patent Application No. 60/177,562 filed Jan. 21, 2000.

STATEMENT CONCERNING FEDERALLY SPONSORED RESEARCH OR DEVELOPMENT

Not applicable.

BACKGROUND OF THE INVENTION

1. Field of the Invention

This invention relates to slide-out support systems for recreational vehicles ("RVs") such as trailers and motor homes and in particular to a slide-out support system in which movable support beams are relatively thin so that the support system is low profile, so the beams can fit into grooves in the floor or between the stationary floor and the movable floor when the movable floor is retracted.

2. Discussion of the Prior Art

In the support systems for slide-out rooms of RVs the space under the slide-out room is sometimes very limited. Since the support system must be rigid so as to extend and retract a room and support it while extended, the limitation on space presents a challenge to make the support system sufficiently rigid.

In addition, in prior systems the movable floor slid or had rollers which rolled on top of the stationary floor during extension and retraction. Over time, this would wear on or mar the stationary floor.

SUMMARY OF THE INVENTION

The present invention provides a slide-out support system in which rails of the system are moved relative to stationary frames which support the rails, and the rails partially or wholly fit within the thickness of the floor. For this purpose, the floor may be grooved in the bottom so as to receive the slide-out beams. Thereby, a low profile system is provided in which the telescoping rails require little, if any, room under the floor.

In a preferred form, a lead screw is journalled and axially fixed relative to one of the slide-out beams so as to move longitudinally with the rail. As the lead screw is turned, either manually or by a motor, it causes the beam to extend or retract, depending upon the direction the screw is turned. Also fixed to the beam may be a linear gear rack, which meshes with a pinion gear that drives a shaft which extends laterally and mounts at its laterally opposite end another pinion gear. This pinion gear is in meshing engagement with another gear rack which is fixed to another slide-out rail so that both slide-out rails extend or retract together.

In addition, the fixed support preferably supports the rail so that it cannot pivot about a lateral axis, i.e. a horizontal axis which is perpendicular to the longitudinal direction. This relieves some or all of the weight of the slide-out room from being borne by the stationary floor, to reduce or eliminate marring of the stationary floor.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 4 is a cross-sectional view from the plane of the line 4—4 of FIG. 3;

FIG. 5 is a cross-sectional view from the plane of the line 5—5 of FIG. 4;

FIG. 6 is a cross-sectional view from the plane of the line 7—7 of FIG. 5 with the system retracted;

FIG. 7 is a view similar to FIG. 6 with the system extended;

FIG. 8 is a detail fragmentary cross-sectional view showing the connections of the two ends of the lead screw to the slide-out support rail;

FIG. 9 is a top cross-sectional view similar to FIG. 4 showing an alternate embodiment of the invention; and FIG. 10 is a view similar to FIG. 4 showing another alternate embodiment of the invention.

DETAILED DESCRIPTION OF THE PREFERRED EMBODIMENTS

Figure 1:
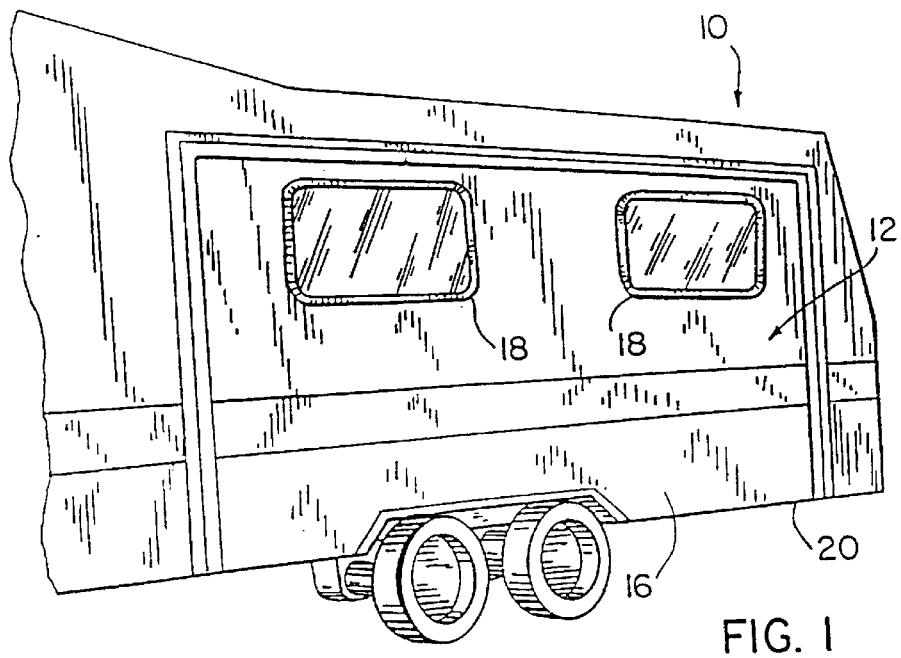
FIG. 1 is a perspective view of a vehicle with its slide-out room retracted.

FIG. 1 illustrates the side of an RV 10 with its slide-out room 12 retracted. The slide-out room 12 has windows 18, an outer wall 16, and an outer bottom edge 20.

Figure 2:
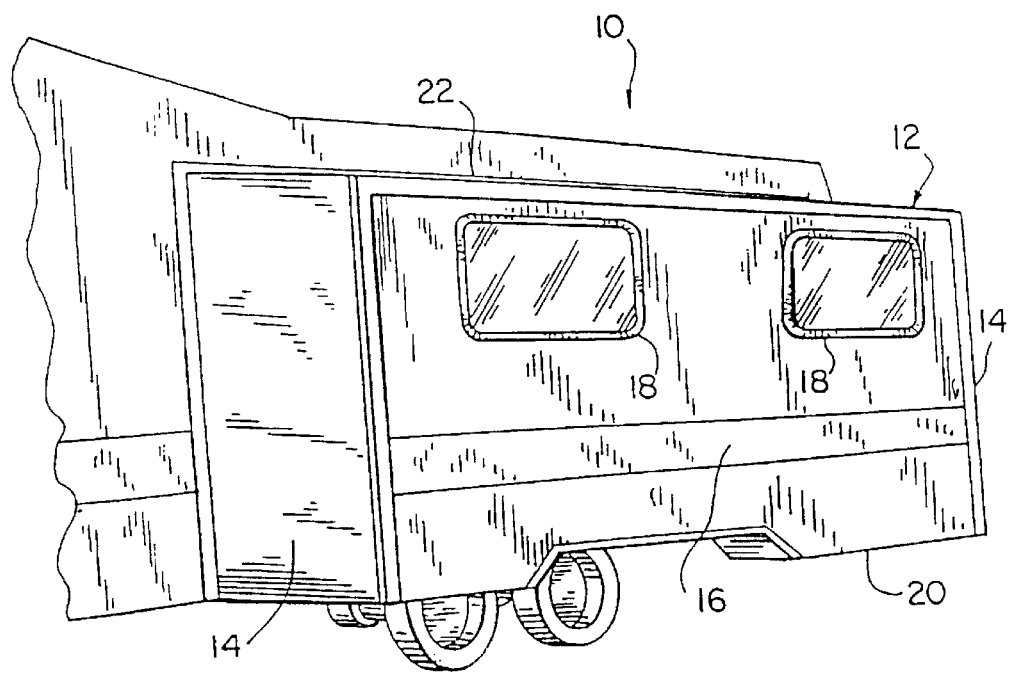
FIG. 2 is a perspective view of a vehicle with its slide-out room extended.

FIG. 2 illustrates the RV 10 with the slide-out room 12 extended. As illustrated, the slide-out room 12 also has end walls 14 and a top wall 22. Slide-out rooms, in general, are well known in the art and are used to expand the interior volume of the RV. As is well known, weatherproof seals are provided between the end walls 14, the top wall 22, and the side wall of the RV, as well as sometimes between the floor 64 (FIG. 3) of the slide-out room 12 and the stationary floor 65 of the RV to prevent wind, rain, dirt, and insects from entering the RV.

Figure 3:
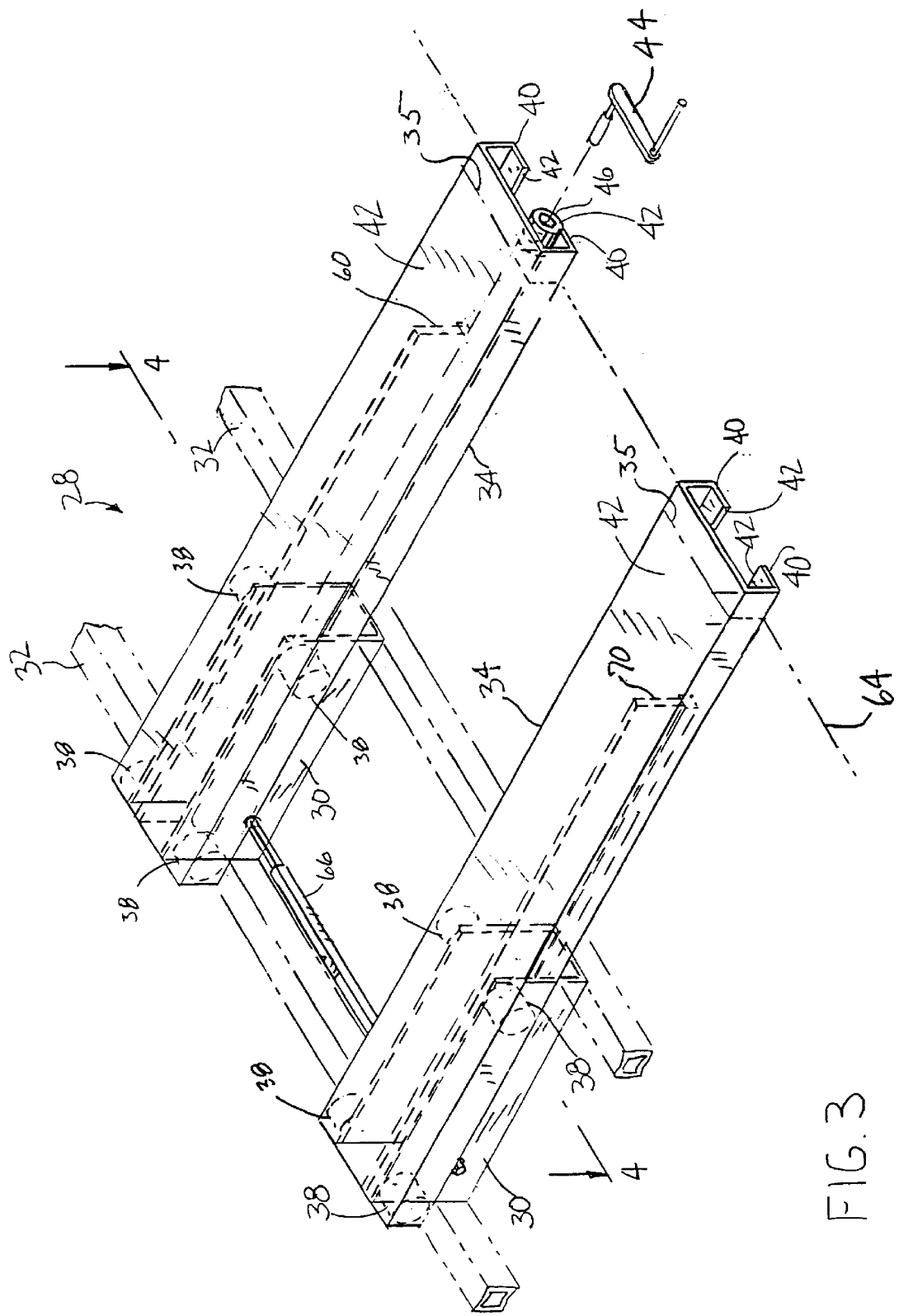
FIG. 3 is a perspective view of a slide-out system of the invention shown in a fully extended position.

FIG. 3 illustrates a slide-out support system 28 of the invention, which is mounted to the frame of the RV under the slide-out room 12. Inner fixed support frames 30 of the system are welded or otherwise fixedly attached to beams 32 of the frame of the RV. The frame members 32 run longitudinally relative to the RV, so that the outer rails 34 extend and retract laterally, in the same direction that the slide-out room 12 extends and retracts. Inner fixed support rails 30 are U-shaped channels that are generally open at the top, and outer rails 34 are C-shaped, having a top wall 42, side walls and flanges 40 extending inwardly with inward edges 42 defining the slot of the C-shape, with the slot opening downwardly at the bottom of the rail 34. As shown in FIG. 3, each rail 34 is received in a laterally running groove 35 in the bottom of the floor 64, which groove is just large enough to receive the respective rail 34. Each rail 34 may be wholly or partially received in the groove 35, depending on the depth of the groove. Thus, when the movable floor 64 is retracted, the rails 34 and screw 46 are between the movable floor 64 and the stationary floor 65, and the movable floor 64 is supported above the stationary floor, or at least much of the weight of the slideout room is relieved from being supported by the stationary floor 65, to reduce wear of the stationary floor 65.

As shown in FIG. 3, each inner fixed support frame 30 mounts four rollers 38, one at each upper corner, and the rollers 38 can rotate about longitudinal axes. The rollers 38 are received in the space between flanges 40 of the rails 34 and the top walls 42 of the rails 34. Each inner frame 30 is received in the space between the flanges 40 of the respective rail 34. At the interface between the edges 42 and the opposite sides of each inner frame 30, nylon or other lubricious plastic wear strips can be provided, which also help lateral alignment of the rails 34 as they are extended and retracted. Such wear strips or pads can also be provided on the outer ends of the axle posts which mount the rollers 38 to slide against the inside surface of the sidewalls of the rails 34.

As stated above, the rails 34 are fixed to the slide-out room 12. The rails 34 are retracted with the floor 64 of the slide-out room 12 over the stationary floor of the RV, supporting the weight of the slide-out room in the retracted position. As stated above, an advantage is that scuffing of the stationary floor by the movable floor 64 is reduced since the rails 34 support the floor 64 up over the stationary floor in the retracted position and while the room 12 is being retracted and extended. This differs from prior art constructions in which the movable rails were only attached to the room at the outer side of the room and the slide-out floor simply road up over the stationary floor during retraction and extension.

Referring to FIGS. 4–8, the system of FIG. 3 is driven extended and retracted by a manually turned lead screw 46. Handle 44 may be used to turn the lead screw 46. The lead screw 46 is threaded into a nut 48 which is welded or otherwise fixedly attached to the inner frame 30 which the lead screw 46 extends through. Members 50 and 52 are welded to the rail 34 and the lead screw 46 extends through holes in the members 50 and 52. Sleeves 54 and 58 are received over the ends of the screw 46 and pinned thereto by pins 80 with thrust bearings 82, which may be roller bearings as shown, journal bearings, or bushings, between the respective end hub 54 and 58 and wall 50 and 52. Thus, when the screw 46 is turned, it moves axially relative to the nut 48, and carries the rail 34 to which it is affixed by walls 50 and 52 with it.

The rail 34 on the opposite side of the room must also be driven synchronously with the rail 34, which is attached to the lead screw 46, and for this a rack and pinion drive is provided. Gear rack 60, having gear teeth at the bottom of a beam, is welded or otherwise attached to the rail 34 which is attached to the screw 46, and a pinion 62 meshes with the gear rack 60. Pinion 62 is journalled by the inner rail 30 which houses it and turns with shaft 66 which has at its opposite end a pinion 68 which is journalled by the opposite inner frame 30. Pinion 68 meshes with rack 70 which is welded or otherwise attached to the rail 34 which is driven by the pinion 68.

FIG. 9 illustrates a variation which lacks the lead screw 46 and associated structures and drives both rails 34 with a rack and pinion drive which is driven by a motor 84.

FIG. 10 illustrates another variation which is similar to FIG. 4 but in which the lead screw 46 is driven by a motor 86 which would be mounted to the adjacent rail 34.

Many modifications and variations to the preferred embodiments described will be apparent to those skilled in the art. Therefore, the invention should not be limited to the embodiments described.

I claim:

1. In a support system for expanding and retracting a slide-out room of a recreational vehicle having a floor movable between an expanded position and a retracted position, said support system including extendable and retractable rails fixed to the room for expanding and retracting the room, rollers for supporting the rails relative to a fixed support and a drive system for moving the rails in and out, the improvement wherein each said rail fits at least partially within the thickness of a floor of said room, wherein each said rail has a top wall which is generally parallel to said floor of said room, at least one side wall depending from the top wall, and at least one flange extending inwardly from the side wall spaced from and generally parallel to the top wall, said flange having an inner edge with a space adjacent the inner edge, and said fixed support extends upwardly through said space and mounts rollers which roll between said top wall and said flange inside of said rail.

2. The improvement of claim 1, wherein said floor of said room has a groove in which said rail is received.

3. The improvement of claim 2, wherein each said rail is C-shaped having spaced apart side walls depending from said top wall and having flanges spaced from and generally parallel to said top wall with spaced inner edges defining a slot.

4. The improvement of claim 3, wherein a gear rack having gear teeth which extend generally parallel to said rail has a supporting portion that extends up through said slot and is affixed to said rail.

5. The improvement of claim 3, wherein said gear rack is affixed to said top wall inside said rail.

6. The improvement of claim 4, wherein said teeth of said gear rack mesh with a gear which is below said rail.

7. The improvement of claim 6, wherein the gear associated with each said rail is connected by a shaft to the gear of the other said rail so that said gears turn in unison.

8. The improvement of claim 7, wherein said shaft is driven by an electric motor.

9. The improvement of claim 7, wherein said rails are extended and retracted by a lead screw.

10. The improvement of claim 9, wherein said lead screw is manually driven.

11. The improvement of claim 9, wherein said lead screw moves longitudinally in or out with said rails.

12. In a support system for expanding and retracting a slide-out room of a recreational vehicle having a floor movable between an expanded position and a retracted position, said support system including one or more extendable and retractable rails fixed to the room for expanding and retracting the room, rollers for supporting the rails relative to a fixed support and a drive system for moving the rails in and out, the improvement wherein each said rail fits at least partially within the thickness of said floor of said room and said rail is driven by a lead screw that moves longitudinally with said rail.

13. In a support system for expanding and retracting a slide-out room of a recreational vehicle having a floor movable between an expanded position and a retracted position, said support system including extendable and retractable rails fixed to the room for expanding and retracting the room, rollers for supporting the rails relative to a fixed support and a drive system for moving the rails in and out, the improvement wherein each said rail fits at least partially within the thickness of said floor of said room and said fixed support supports said rail on rollers that are longitudinally spaced apart so as to restrain said rail from pivoting about a lateral horizontal axis and maintain a floor of said room generally horizontal, wherein each said rail is C-shaped, having a top wall which is generally parallel to said floor of said room, spaced side walls depending from the top wall, and flanges extending inwardly from the side walls spaced from and generally parallel to the top wall, each flange having an inner edge spaced from the inner edge of the other flange so as to define a slot between said edges through which said fixed support extends upwardly, wherein said rollers extend outwardly from said fixed support and roll between said top wall and said flanges inside of said rail.

14. The improvement of claim 13, wherein each said rail is is positioned to an outside of the associated fixed support.

* * * * *